(12) United States Patent
Konishi et al.

(10) Patent No.: US 6,826,323 B2
(45) Date of Patent: Nov. 30, 2004

(54) OPTICAL CIRCULATOR

(75) Inventors: Mieko Konishi, Tokyo (JP); Hiroshi Matsuura, Tokyo (JP); Satoru Abe, Tokyo (JP)

(73) Assignee: The Furukawa Electric Co. Ltd., Tokyo (JP)

( * ) Notice: Subject to any disclaimer, the term of this patent is extended or adjusted under 35 U.S.C. 154(b) by 137 days.

(21) Appl. No.: 10/011,636

(22) Filed: Dec. 5, 2001

(65) Prior Publication Data

US 2002/0126945 A1 Sep. 12, 2002

(30) Foreign Application Priority Data

Mar. 9, 2001 (JP) ............................. 2001-67197

(51) Int. Cl.⁷ .............................. G02B 6/26; G02B 6/42
(52) U.S. Cl. ............................. 385/15; 385/11; 385/47; 359/484; 359/494; 359/495; 359/496; 359/497; 359/618; 398/152
(58) Field of Search .......................... 385/11, 15, 47; 359/494–497, 484, 618; 398/152

(56) References Cited

U.S. PATENT DOCUMENTS

| | | | | |
|---|---|---|---|---|
| 4,094,579 A | * | 6/1978 | McMahon et al. | 385/49 |
| 4,294,509 A | * | 10/1981 | Nagao | 385/36 |
| 5,089,786 A | * | 2/1992 | Tamura | 359/333 |
| 5,204,771 A | | 4/1993 | Koga | 359/281 |
| 5,574,596 A | | 11/1996 | Cheng | 359/484 |
| 5,612,813 A | | 3/1997 | Damman et al. | 359/281 |
| 5,724,165 A | * | 3/1998 | Wu | 398/55 |
| 5,905,823 A | * | 5/1999 | Shintaku et al. | 385/11 |
| 5,909,310 A | | 6/1999 | Li et al. | 359/484 |
| 5,930,039 A | * | 7/1999 | Li et al. | 359/484 |
| 6,178,044 B1 | | 1/2001 | Li et al. | 359/484 |
| 6,226,115 B1 | * | 5/2001 | Shirasaki et al. | 359/280 |
| 6,246,807 B1 | | 6/2001 | Lu et al. | 385/11 |
| 6,331,912 B1 | * | 12/2001 | Au-Yeung et al. | 359/484 |
| 6,438,278 B1 | * | 8/2002 | Liu et al. | 385/11 |
| 6,587,273 B2 | * | 7/2003 | Xue et al. | 359/618 |
| 6,724,539 B2 | * | 4/2004 | Kenmochi et al. | 359/634 |
| 2003/0113055 A1 | * | 6/2003 | Zhao et al. | 385/16 |

FOREIGN PATENT DOCUMENTS

| | | |
|---|---|---|
| JP | 2539563 | 8/1996 |
| JP | 10-062720 | 3/1998 |
| JP | 11-264954 | 9/1999 |

\* cited by examiner

*Primary Examiner*—Brian Healy
*Assistant Examiner*—Daniel Petkovsek
(74) *Attorney, Agent, or Firm*—Knobbe Martens Olson & Bear LLP

(57) ABSTRACT

An optical circulator has optical elements structured to control return loss for light propagating from an input port to an output port. In some embodiments, the optical circulator has a port configuration that aligns a first optical port along the central axis of a first lens, aligns a second optical port along the central axis of a second lens and positions a third optical port adjacent to the first optical port. A light adjusting optical element may be included to adjust the direction of light emanating from the first optical port and the direction of light propagating to the third optical port to be parallel to each other.

18 Claims, 10 Drawing Sheets

FIG. 2
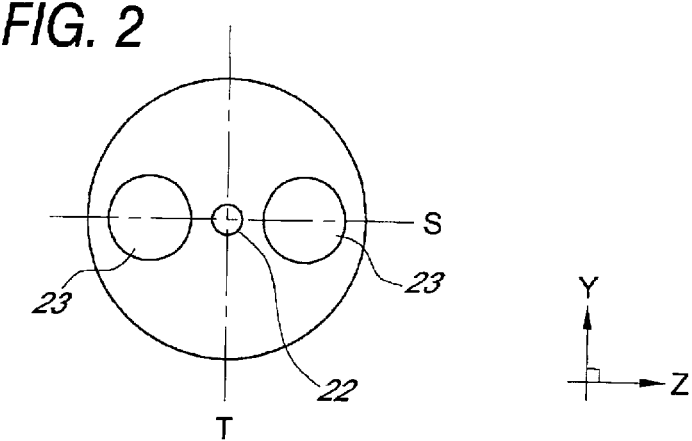
FIG. 3
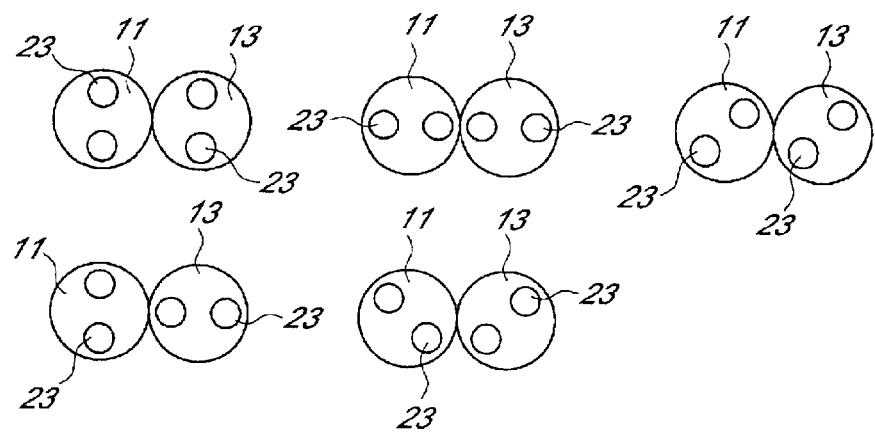
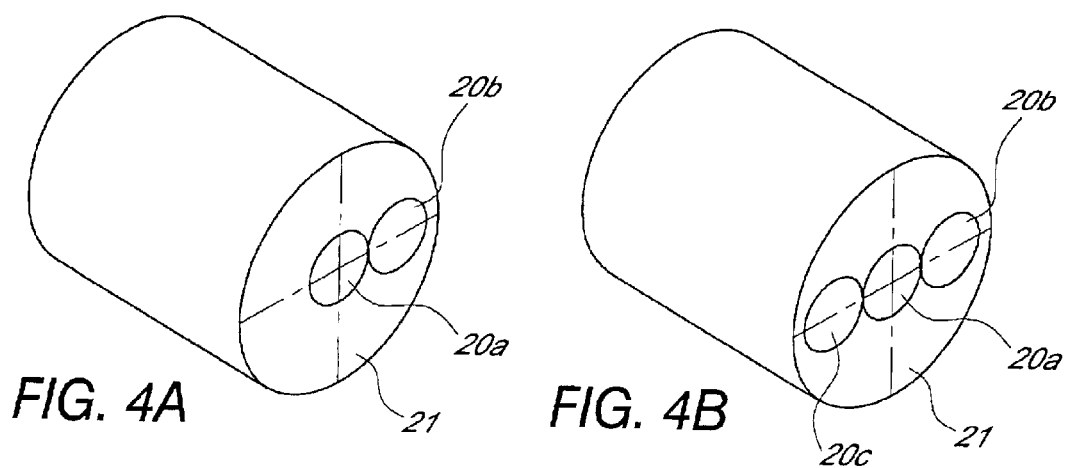
FIG. 4A    FIG. 4B

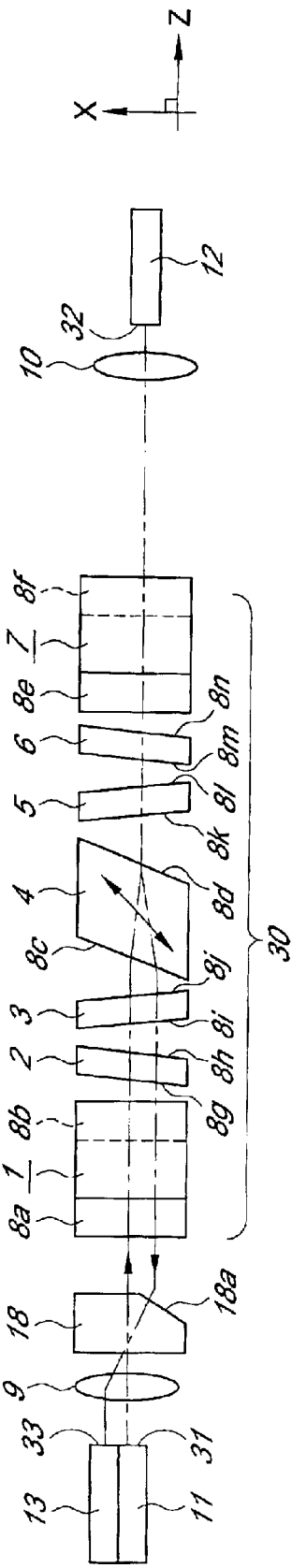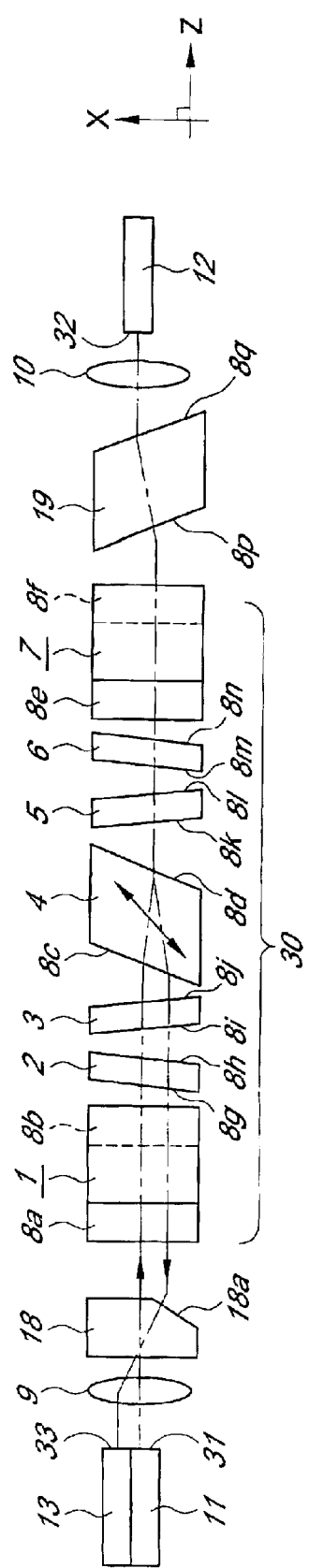

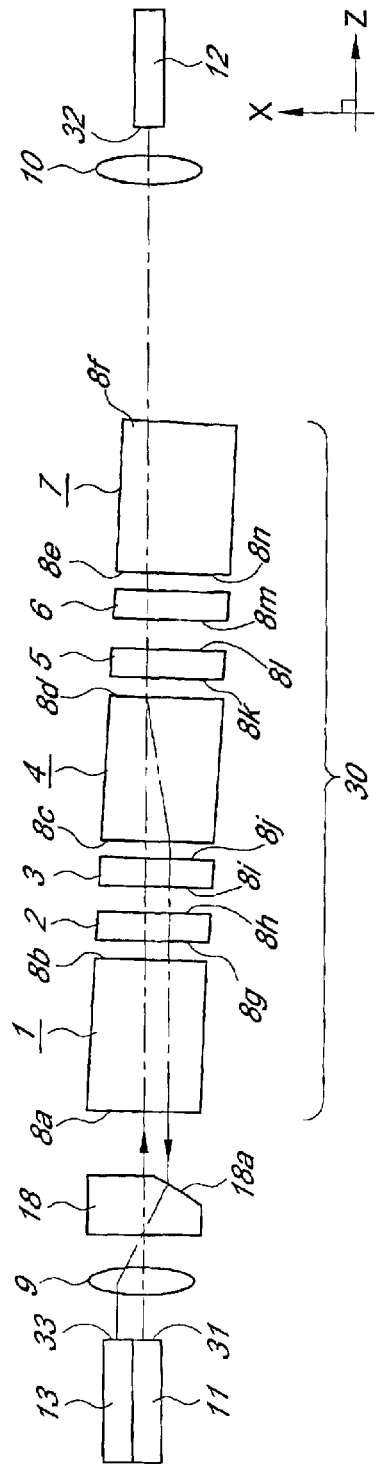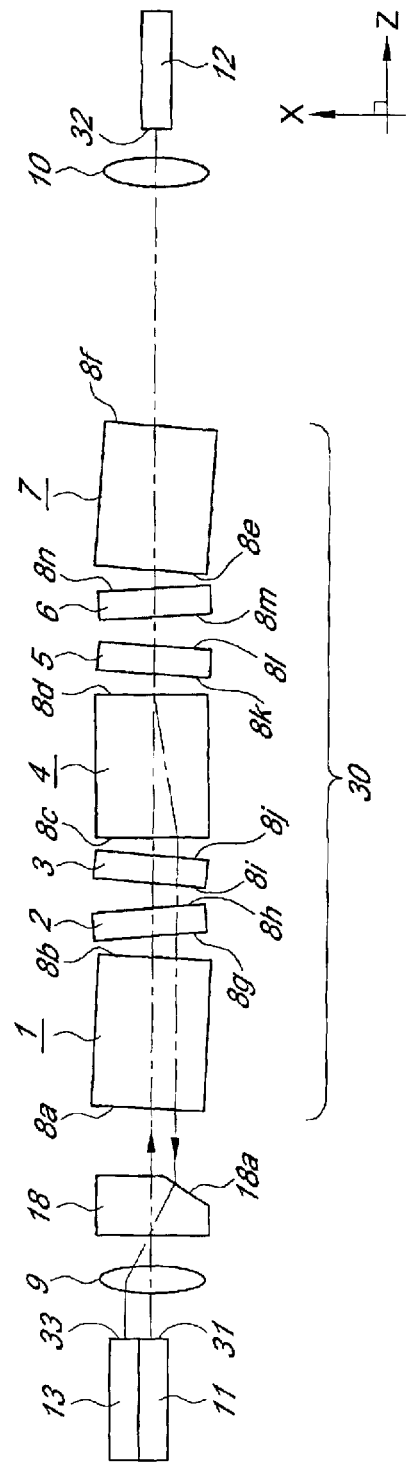

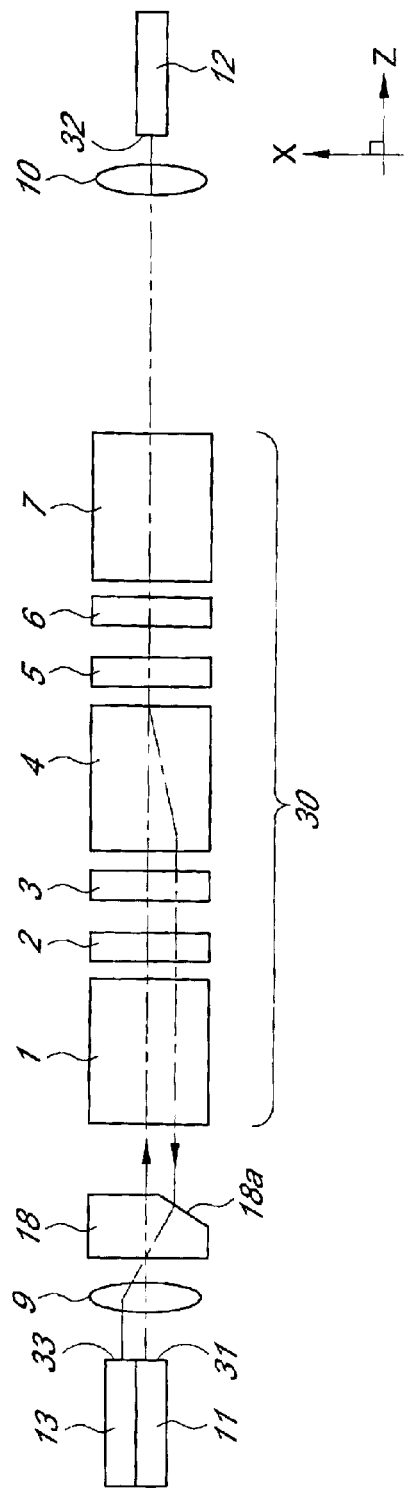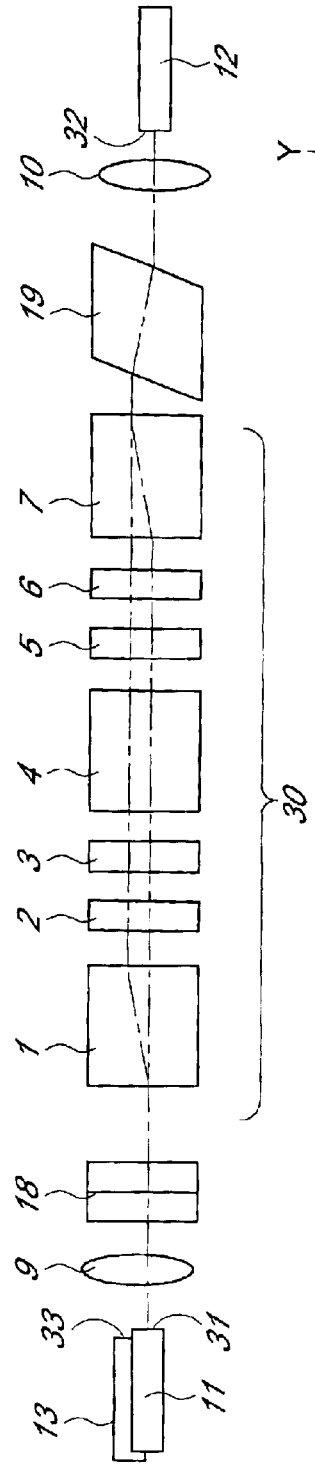

OPTICAL CIRCULATOR

BACKGROUND OF THE INVENTION

1. Field of the Invention

The invention relates to optical circulators.

2. Description of the Related Art

Optical circulators are devices having multiple optical ports and include optical structures that transfer light from an optical port n to another optical port n+1. For example, a three port optical circulator has three optical ports and an optical structure that transfers light from a first optical port to a second optical port and from the second optical port to a third optical port. Various optical structures have been proposed for optical circulators. The schematic in FIG. 13 shows one example of a typical three port optical circulator having an optical circulator unit 30, a first optical port 31 and a third optical port 33 arranged adjacent to each other on one end of the optical circulator unit 30, and a second optical port 32 disposed on the opposite end of the optical circulator.

Light enters an optical circulator at a light entry port and then propagates through the optical circulator to an associated light exit port. In a typical three port optical circulator, the first optical port 31 and the second optical port 32 are light entry ports while the second optical port 32 and the third optical port 33 are light exit ports. Thus, the second optical port 32 functions both as a light entry port, for light propagating to the third optical port 33, and a light exit port, for light emanating from the first optical port 31. Due to its relationship with both the first optical port 31 and third optical port 33, the proper alignment of the second optical port 32 with the first optical port 31 must be done in conjunction with the alignment of the third optical port 33. In addition, a positional change of one optical port correspondingly affects the other two optical ports.

The optical circulator unit 30 typically contains a series of optical elements functionally structured to pass light from the first optical port 31 to the second optical port 32 and the second optical port 32 to the third optical port 33. One example of a conventional optical circulator unit showing the optical element structure is depicted in FIG. 14, which is the one proposed in the Japanese Patent No. 2,539,563. The optical circulator unit 30 in FIG. 14 comprises optical elements arranged in a series along an optical axis Z direction, with the optical surfaces (light incidence surface and light exit surfaces) of adjacent optical elements facing each other. The structure of the typical optical circulator unit 30 in FIG. 14 specifically consists of a first birefringent crystal plate 1, a first split half wave plate 2, a first Faraday rotator 3, a second birefringent crystal plate 4, a second Faraday rotator 5, a second split half wave plate 6, and a third birefringent crystal plate 7, arranged in that order.

Another structural example of a conventional optical circulator unit is shown in FIG. 15. While the resulting optical functionality of the optical circulator unit 30 shown in FIG. 15 is the same as the one shown in FIG. 14, the number of optical elements used in the structure of the optical circulator unit 30 in FIG. 15 has been reduced. Specifically, a first split Faraday rotator 15 in FIG. 15 replaces the first split half wave plate 2 and the first Faraday rotator 3, shown in FIG. 14, and a second split Faraday rotator 16 as shown in FIG. 15 replaces the second split half wave plate 6 and the second Faraday rotator 5 shown in FIG. 14.

One problem with conventional optical circulators is uncontrolled optical system return loss due to reflecting incident light back along the same path it came from. Additionally, optical waveguide core alignment problems relating to the complexity of aligning three associated optical cores can decrease the optical circulator reliability. Optical communication systems employing optical circulators can be adversely affected by both of these problems.

SUMMARY OF THE INVENTION

The invention comprises optical circulators, methods of making optical elements for an optical circulator, methods of controlling light in an optical circulator, and optical communication systems using an optical circulator. Optical circulators are provided for controlling the back propagation of optical signals that occur within the optical circulator. In one embodiment, the invention comprises an optical circulator comprising at least three optical ports and at least one optical element having optical surfaces slanted with respect to an optical axis so as to form at least a pair of oblique optical surfaces, the relative slant of the optical surfaces such that the direction of the optical path exiting the optical element is at least substantially parallel to the direction of the optical path entering the optical element.

In another embodiment, the invention comprises an optical circulator having at least three optical ports and configured to route light input at port n to port n+1 comprising at least one optical element of a non-rectangular parallelepiped shape.

In yet another embodiment, the invention comprises an optical circulator comprising at least three optical signal ports and a substantially parallelepiped shaped optical element disposed so that its optical surfaces are non-perpendicular to an optical axis, whereby at least some incident light is reflected in a direction non-parallel to its incident direction.

In another embodiment, the invention comprises an optical circulator comprising a first lens and a second lens, a first optical waveguide having a first optical port and a third optical waveguide having a third optical port arranged adjacent to each other and facing the first lens, positioned with either the first optical waveguide and the first optical port or the third optical waveguide and the third optical port aligned along the central axis of said first lens, a second optical waveguide having a second optical port disposed facing second lens and aligned along the central axis of the second lens, and a prism disposed adjacent to the first lens adjusting the direction of light emanating from the first optical port and the direction of light propagating to the third optical port so that the optical path of light emanating from the first optical port is parallel to the optical path of light propagating to the third optical port.

In a further embodiment, the invention comprises an optical circulator comprising at least three optical signal ports, at least one optical element having a pair parallel optical surfaces, the optical surfaces having an oblique relative slant with respect to an optical axis, a first lens and a second lens, a first optical waveguide having a first optical port and a third optical waveguide having a third optical port arranged adjacent to each other so that the first optical port and the third optical port face the first lens and positioned with either the first optical waveguide and the first optical port or the third waveguide and the third optical port at least substantially aligned along the central axis of the first lens, and a second optical waveguide having a second optical port disposed facing the second lens and at least substantially aligned along the central axis of the second lens. The optical circulator further comprises a light path adjusting optical element intersecting the light path passing through the first optical port and the light path passing through the third optical port and adjusting the direction of the light paths so the light passing through the first optical port and the light passing through the third optical port is at least substantially parallel to each other, and an optical offset element configured to produce a parallel shift in the optical path of light propagating through the optical offset element.

The invention also comprises methods of making an optical circulator. In one embodiment the invention comprises a method for cutting optical material to form the oblique optical surfaces. The method includes cutting an optical material along a first plane intersecting the lateral sides parallel to the optical material's longitudinal axis where the first plane is slanted to be oblique with respect to the longitudinal axis, cutting the optical material along a second plane at least substantially parallel to the first plane, and polishing the cut surfaces of the optical material so as to form optical surfaces. This method further comprises arranging the optical material in a structure with other optical elements so as to establish a first optical path that optically connects a first optical port and a second optical port, and also establishes a second optical path that optically connects a second optical port and a third optical port, where the optical surfaces are positioned to be oblique with respect to the direction of the incident optical paths.

In another embodiment of the invention, the method includes polishing a first surface forming a lateral side of an optical prism to form a first optical surface where the first surface is slanted to form an oblique angle with the top surface of said optical prism, polishing a second surface forming a lateral side of the optical prism to form a second optical surface where the second surface is slanted in a direction at least substantially parallel to the first surface, and cutting the optical prism along a plane intersecting the first optical surface and the second optical surface and perpendicular to the top surface of the optical prism. This method further comprises arranging the optical prism in a structure with other optical elements so as to establish a first optical path that optically connects a first optical port and a second optical port, and also establishes a second optical path that optically connects a second optical port and a third optical port, where the optical surfaces of the optical prism are positioned to be oblique with respect to the direction of the incident optical paths.

Methods for transferring light through an optical circulator are provided in another embodiment of the invention. In one embodiment of the invention, a method is provided for transferring an optical signal along an optical path in an optical circulator between an input optical port and an output optical port to control the back propagation of light along the optical path. This method comprises passing an optical signal through a first oblique optical surface and subsequently passing the optical signal through a second oblique optical surface at least substantially parallel to said first oblique optical surface.

In another embodiment of the invention, a method of propagating light through an optical circulator so as to minimize the size of the optical circulator and increase reliability is provided. This method comprises passing a first optical signal from a first optical port straight through the central axis of a first lens, through an optical circulator unit and straight through the central axis of a second lens into a second optical port, passing a second optical signal from the second port straight through the central axis of a second lens, through an optical circulator unit and through a prism, refracting the second optical signal as it passes through the prism, passing the second optical signal through the first lens, refracting the second optical signal as it passes through the first lens so it is parallel in direction to the direction of the first optical signal and passing the second optical signal into a third optical port adjacent to the first optical port.

Optical communication systems utilizing the present invention are also provided. According to one embodiment of the invention, this system comprises optical fiber, at least one optical signal emitter, and at least one optical signal receiver. The system further comprises an optical circulator comprising at least one optical element having optical surfaces slanted with respect to an optical axis so as to form at least a pair of oblique optical surfaces, the relative slant of the optical surfaces such that the optical path direction exiting said optical element is at least substantially parallel to the optical path direction entering the optical element.

In another embodiment of the invention, the optical communication system comprises optical fiber, at least one optical signal emitter and at least one optical signal receiver. The system further comprises an optical circulator comprising a first lens and a second lens, a first optical port and a third optical port disposed adjacent to each other, the first optical port and the third optical port facing the first lens and disposed with either the first optical port or the third optical port aligned along the central axis of the first lens, a second optical port disposed facing the second lens and aligned along the central axis of the second lens, and a light path adjusting optical element intersecting the light paths propagating through the first optical port and the third optical port, adjusting the light paths so the light propagating through the first optical port and the third optical port are at least substantially parallel to each other.

BRIEF DESCRIPTION OF THE DRAWINGS

FIG. 2 is an explanatory view showing the cross-sectional structure of polarization maintaining optical fiber.

FIG. 3 is a diagram showing optical waveguide end faces and illustrating various relative positions of the polarization direction for polarization maintaining optical fiber.

FIG. 4A is an explanatory view of a capillary which can be used as an optical waveguide holder.

FIG. 4B is a explanatory view of a capillary which can be used in an optical circulator.

FIG. 6 is a plan view showing the main part of an optical circulator, according to one embodiment of the invention.

FIG. 7 is a plan view showing the main part of an optical circulator, according to one embodiment of the invention.

FIG. 9A is a plan view showing the main part of an optical circulator, according to one embodiment of the invention.

FIG. 9B is a plan view showing the main part of an optical circulator and illustrating an alternate arrangement for the same optical elements shown in FIG. 9A, according to another embodiment of the invention.

FIG. 11 is a plan view showing the main part of an optical circulator, according to one embodiment of the invention.

FIG. 12 is a perspective view showing the main part of an optical circulator, according to one embodiment of the invention.

DETAILED DESCRIPTION OF THE PREFERRED EMBODIMENT

Embodiments of the invention will now be described with reference to the accompanying Figures, wherein like numerals refer to like elements throughout, although the like elements may be positioned differently or have different characteristics in different embodiments. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for it desirable attributes or which is essential to practicing the inventions herein described.

Figure 17:
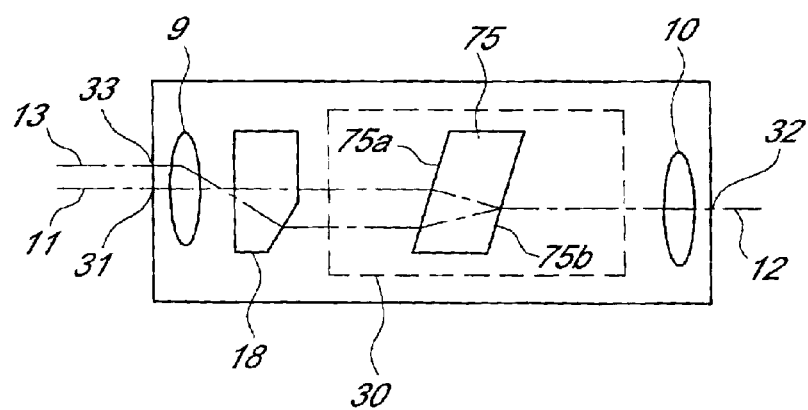
FIG. 17 is a plan view showing the conceptual structure of an optical circulator, according to one embodiment of the invention.

The present invention relates to improvements in optical circulator technology. A conceptual diagram that illustrates an optical circulator containing an optical element 75 with oblique optical surfaces is shown in FIG. 17, according to one embodiment of the invention. On one end of the optical circulator a first optical port 31 and a third optical port 33 are disposed adjacent to each other. On the opposite end of the optical circulator a second optical port 32 is disposed. The optical circulator includes a first lens 9, a second lens 10, a prism 18 and an optical circulator unit 30. In this embodiment, the optical circulator unit 30 includes at least one optical element 75 with optical surfaces 75a and 75b that are slanted with respect to an optical axis forming a pair of oblique optical surfaces. In FIG. 17, the optical circulator unit 30 comprises multiple optical elements but only one is shown for illustrative purposes.

As shown in FIG. 17, light, which is also referred to herein as an optical signal or a light beam, propagating from one optical port to another optical port passes through an optical element 75 with oblique optical surfaces. For example, light propagating along a first optical path, from the first optical port 31 to the second optical port 32, emanates from the first optical port 31, passes through the first lens 9 and through the prism 18 and enters the optical circulator unit 30. The light continues propagating through the oblique optical surfaces 75a and 75b of an optical element 75, through the second lens 10 and into the second optical port 32. Light propagating along a second optical path, from the second optical port 32 to the third optical port 33, emanates from the second optical port 32, passes through the second lens 10, and enters the optical circulator unit 30. The light continues propagating through the oblique optical surfaces 75b and 75a of an optical element 75, through the prism 18 where the light is refracted, through the first lens 9 where the light is further refracted and into the third optical port 33. The relative slant of the optical surfaces 75a and 75b of the optical element 75 shown in the optical circulator 30 are such that the light path direction exiting the optical element 75 is at least substantially parallel to the light path direction entering the optical element 75.

The shape and relative alignment of the optical surfaces in an optical circulator can affect its functional effectiveness. In the conventional optical circulator unit 30 shown in FIG. 14, the optical surfaces of the optical elements are all perpendicular with respect to the optical axis. When light passes through perpendicular optical surfaces, a portion of the light is reflected back in the direction the light came from. The backwards propagation of incident light, i.e., in the opposite direction of the incident light along the optical path, is an undesirable property in an optical circulator and is referred to as return loss. As return loss is caused by incident light reflecting from optical interfaces, the amount of return loss correspondingly increases with an increasing number of vertical surfaces intersecting the optical path. The optical circulator unit 30 in FIG. 14 suffers from a relatively large return loss due to every optical surface being perpendicular with respect to the optical axis.

Figure 14:
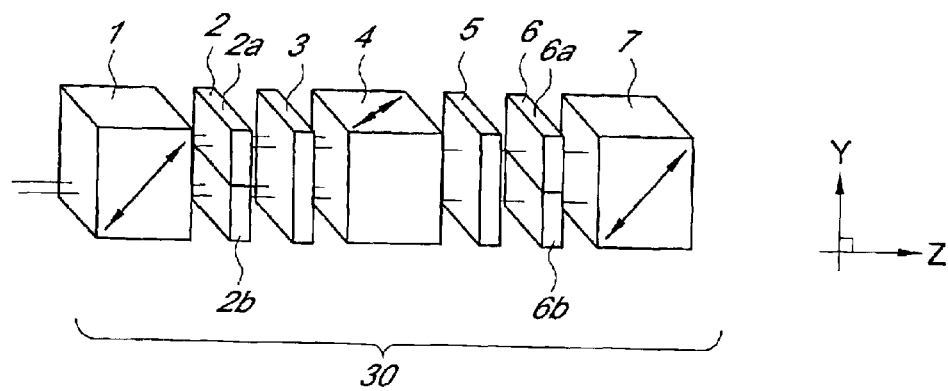
FIG. 14 is a perspective view showing a comparative example of the main part of an optical circulator unit.
Figure 15:
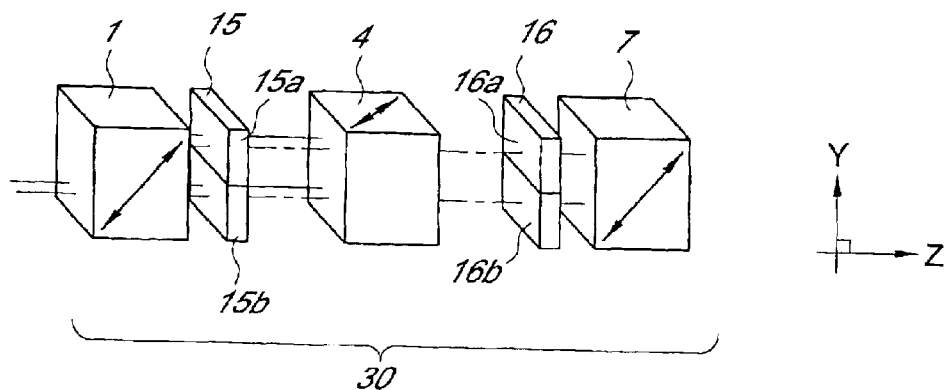
FIG. 15 is a perspective view showing a comparative example of the main part of an optical circulator unit containing split Faraday rotators.

An optical circulator with the characteristic of having at least one optical element with oblique optical surfaces makes the present invention advantageous over the conventional optical circulator shown in FIG. 14 because it provides greater control of light reflected from optical surfaces as the light propagates along the optical paths. As shown in FIG. 17, optical paths connecting the first, second and third optical ports 31, 32 and 33 pass through at least one optical element 75 having optical surfaces 75a and 75b that are slanted with respect to the optical axis thereby forming oblique optical surfaces. The oblique optical surface 75a and the oblique optical surface 75b reflect a portion of the incident light not passing through the optical surface in a direction other than back through the incident light path, thereby controlling return loss.

Figure 16:
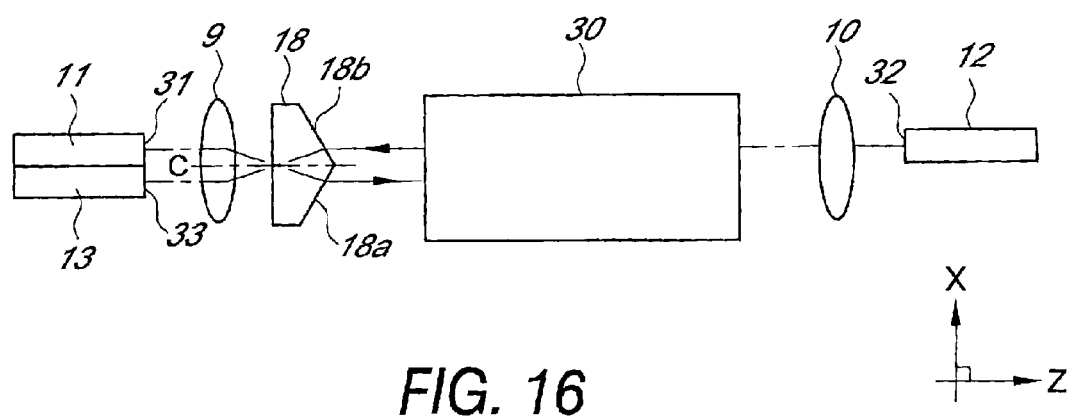
FIG. 16 is a plan view showing a comparative example of an optical circulator unit and optical waveguides.

Another novel aspect of the system of FIG. 17 resolves problems associated with optimal waveguide positioning. Various designs have been used to position optical waveguides and their associated optical ports with the optical circulator unit. FIG. 16 is a plan view of one possible alignment design for an optical circulator 116 showing the structure of the optical elements interposed between the optical waveguides 11, 12 and 13 and the optical circulator unit 30. As shown in FIG. 16, the optical circulator 116 includes a first optical waveguide 11, a first optical port 31, a second optical waveguide 12, a second optical port 32, a third optical waveguide 13, a third optical port 33, a first lens 9 positioned facing the first optical waveguide 11 and the third optical waveguide 13, a prism 18 positioned between the first lens 9 and the optical circulator unit 30, and a second lens 10. The second optical waveguide 12 and optical port 32 are aligned along the central axis of the second lens 10. The first optical waveguide 11 and the third optical waveguide 13 are aligned on opposite sides of the central axis of the first lens 9, laterally positioned symmetrically with respect to the central axis of the first lens 9 (the central axis is indicated by C in FIG. 16). The first and third optical waveguide 11 and 13 are optically coupled to the optical circulator unit 30 by the first lens 9, which they share. Sharing the first lens 9 is advantageous as it reduces the number of components needed to form the optical circulator, thereby making the optical circulator smaller and its structure less complex.

Describing the optical paths shown in FIG. 16, light propagating through the first optical waveguide 11 passes through the first optical port 31, enters the first lens 9 and is refracted. Thereafter, the refracted light reaches a prism 18 where it is refracted further so that when the light is emitted from the prism 18 its direction is parallel to the optical axis (the Z direction in FIG. 16) of the optical circulator unit 30. The light then enters and propagates through the optical circulator unit 30, passes through the second lens 10 and enters the second optical waveguide 12 through the second port 32. In the other direction, light propagating through the second optical waveguide 12 passes through the second optical port 32, passes through the second lens 10, enters and propagates through the optical circulator unit 30 and reaches prism 18, where it is refracted. Thereafter the refracted light passes through the first lens 9 where it is further refracted and enters the third optical waveguide 13 through the third optical port 33.

For the optical circulator 116 shown in FIG. 16, properly positioning the optical cores in the first, second and third optical waveguide 11, 12 and 13 can be a difficult process as all three optical waveguides must be positioned correctly relative to each other, relative to the optical circulator unit 30, and the first and third waveguides must be additionally positioned correctly relative to the central axis of the first lens 9. The complexity of this positioning process can result in increased unreliability of the optical circulator.

If the placement of the first optical waveguide 11 and the third optical waveguide 13 is changed with respect to the first lens 9, positioning the optical waveguides' optical cores can be more easily accomplished. According to one embodiment of the invention, as shown in FIG. 17, the first optical waveguide 11 is aligned to the central axis of the first lens 9, and the third optical waveguide 13 is placed adjacent to the first optical waveguide 11 and positioned to one side of the central axis of the first lens 9. After initially positioning the optical cores of the first and second optical waveguides in this way, positional changes of the optical circulator unit 30 have a less significant effect on maintaining the optical waveguide core alignment. Thus, by aligning the first optical waveguide to the central axis of the first lens 9 and positioning the third optical waveguide adjacent to the first optical waveguide, maintaining optical waveguide core alignment is made easier and the reliability of the optical circulator can be increased.

In an alternative embodiment, the third optical waveguide 13 is placed on the central axis of the first lens 9 and the first optical waveguide 11 is disposed adjacent to the third optical waveguide 13 and positioned to one side of the central axis of the first lens 9. This embodiment also facilitates aligning the optical cores and can similarly increase the reliability of the optical circulator.

Figure 1A:
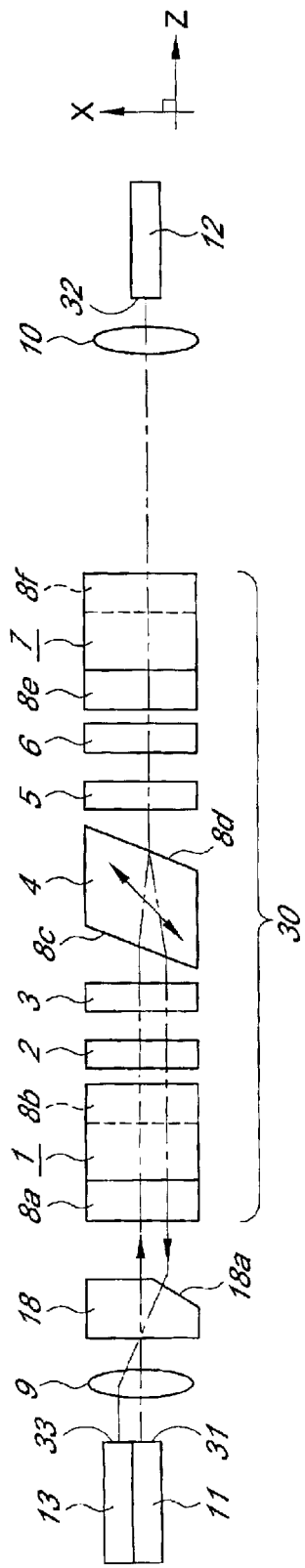
FIG. 1A is a plan view showing the main part of an optical circulator in accordance with one embodiment of the invention.
Figure 1B:
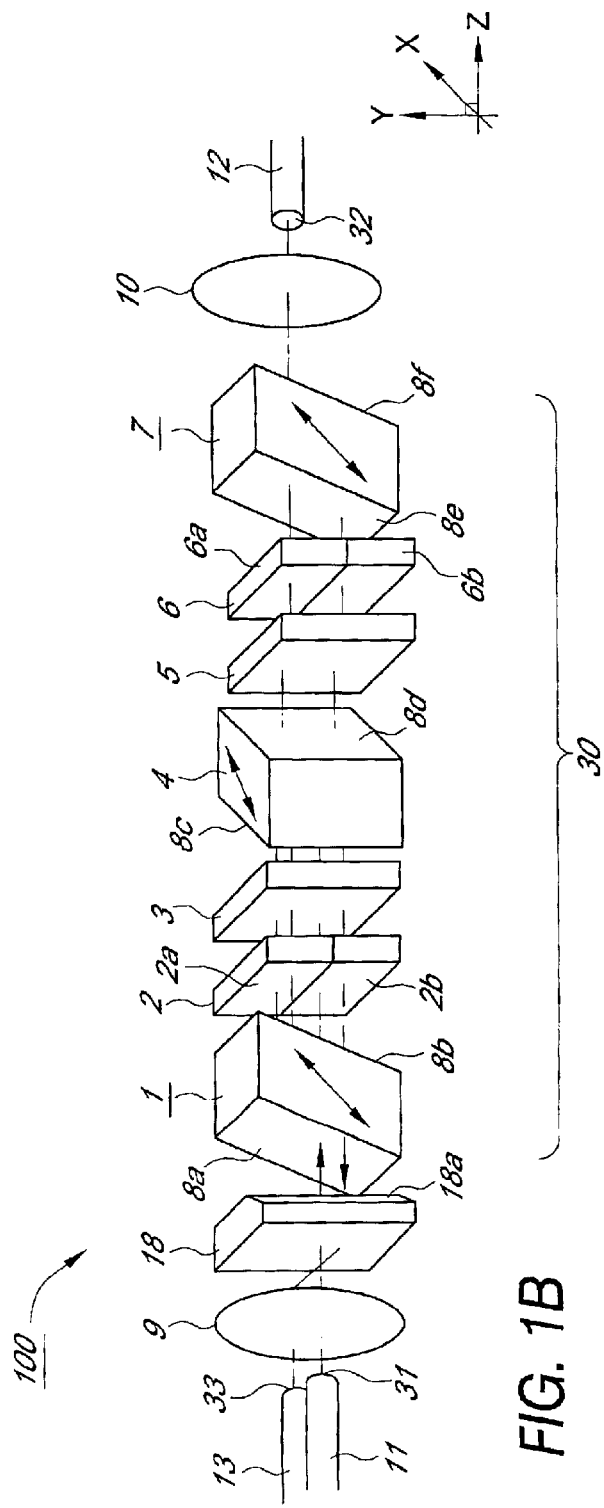
FIG. 1B is a perspective view of the optical circulator shown in FIG. 1A.

The structure of one embodiment of an optical circulator is shown in more detail in FIGS. 1A and 1B. These two Figures show two different views of the same optical circulator 100 according to one embodiment of the invention. FIG. 1A is a plan view of the optical circulator 100 and FIG. 1B is a perspective view thereof. The structure of optical circulator 100 includes an optical circulator unit 30. The term "optical circulator unit" is used throughout the description of the present invention to describe the main group of optical elements in a multiple port optical circulator that establish the different optical paths in the optical circulator, e.g., a first optical path connecting a first optical port to a second optical port and a second optical path connecting a second optical port to a third optical port.

The structure of an optical circulator unit 30 is shown in FIGS. 1A and 1B. This embodiment of the optical circulator unit 30 includes a first polarization divider/combiner 1 (e.g., a first birefringent crystal plate), a first polarization rotator shown according to this embodiment to include a split half-wave plate 2 and a Faraday rotator 3, a light path converter 4 (e.g., a second birefringent crystal plate), a second polarization rotator shown according to this embodiment to include a Faraday rotator 5 and a split half-wave plate 6, and a second polarization divider/combiner 7 (e.g., a third birefringent crystal plate).

The first polarization divider/combiner 1 and the second polarization divider/combiner 7 are optical elements that serve two functions. First, a light beam passing through the first polarization divider/combiner 1 or the second polarization divider/combiner 7 can be divided into two orthogonal plane-polarized light beams that exit the optical element as separate light beams. Also, two orthogonal plane-polarized light beams passing through the first polarization divider/combiner 1 or the second polarization divider/combiner 7 can be combined and exit the optical element as a single light beam.

The light path converter 4 is an optical element that either allows incident light to pass through and be emitted without changing its optical path direction or it changes the optical path direction of the emitted light by shifting the optical path in a parallel direction, i.e., the optical path of the emitted light is parallel to the optical path of the incident light but it has been shifted laterally. These light path-shifting characteristics of the light path converter 4 are due to the optical properties of the birefringent material it is made from. Whether or not the light path converter 4 changes the optical path direction depends on the polarization state of the incident light relative to the internal optical axis direction of the birefringent material used to make the light path converter 4. Incident light with a plane-polarization direction parallel to the optical axis direction of the light path converter 4 will experience a parallel shift when emitted from the light path converter 4, while incident light with a plane-polarization direction perpendicular to the optical axis direction of the light path converter 4 passes through the light path converter 4 without a parallel shift in its optical path.

Birefringence refers to a material that is optically anisotropic, i.e., displays two different indices of refraction. Birefringent crystals, typically used by a person of ordinary skill in the art for splitting unpolarized light into two orthogonal plane-polarized light beams, can be used to form the optical elements for the polarization divider/combiner and the light path converter.

The first split half-wave plate 2 and the second split half wave plate 6, shown in FIGS. 1A and 1B, are reciprocal polarization rotators. A half wave plate rotates plane-polarized light incident thereon by a certain angle. The first and second split half wave plates 2 and 6 are arranged in a position intersecting the optical paths. They are each composed of two half wave plates, where each half wave plate rotates the plane-polarized light by a different angle. As a reciprocal polarization rotator, the half wave plate rotates the plane-polarization of light in the same relative sense (e.g., clockwise) irrespective of the propagation direction through the half wave plate. The first split half wave plate 2 is composed of two reciprocal polarization rotating elements 2a and 2b that have different polarization rotating angles and are arranged together in the Y direction intersecting the optical axis direction Z. The split half wave plate 6 is also composed of two reciprocal polarization rotating elements 6a and 6b that have different polarization angles and are also arranged together in the Y direction intersecting the optical Z axis.

The first Faraday rotator 3 and the second Faraday rotator 5 in FIGS. 1A and 1B are non-reciprocal polarization rotators. Faraday rotators exhibit the "Faraday effect", so-called after its discoverer Michael Faraday, a phenomenon where a block of glass becomes optically active when it is subjected to a strong magnetic field. The field is applied in parallel to the propagation direction of light passing through the rotator, using a cylindrical magnet that is disposed outside the Faraday rotator or by magnetizing the Faraday rotator itself in advance. When plane-polarized light is then sent through the optically active glass in a direction parallel to the applied magnetic field, the plane of polarization is rotated. The amount of rotation is dependent on the strength of the magnetic field and the distance the light travels through the glass. A Faraday rotator thereby rotates the polarization plane of light passing through the rotator.

One feature of a Faraday rotator is its non-reciprocity. Plane-polarized light passing through a Faraday rotator in one direction will have its polarization direction rotated through a certain angle in a clockwise direction, as viewed along the direction of propagation. Plane-polarized light passing through the Faraday rotator in the opposite direction will a have its polarization rotated through the same angle but in the counterclockwise direction, as viewed from along the direction of propagation, i.e., when it goes through it in the other direction it imparts an additional rotation to the polarization instead of taking out the earlier imparted polarization rotation. The first Faraday rotator 3 and the second Faraday rotator 5 rotate the polarization plane of incident light by 45°, according to this embodiment.

Other parts of an optical circulator 100 are also shown in FIGS. 1A and 1B in accordance with this embodiment. A first lens 9 and a second lens 10 are disposed on opposite ends of the optical circulator unit 30. A first optical waveguide 11 and a third optical waveguide 13 are positioned adjacent to each other facing the first lens 9. According to this embodiment, the first optical waveguide 11 and the first optical port 31 are aligned along the central axis of the first lens 9. A second waveguide 12 and the second optical port 32 are disposed facing the second lens 10 and aligned along the central axis of the second lens 10. In this embodiment, a prism 18 having a tapered side 18a is disposed between the first lens 9 and the optical circulator unit 30. The prism 18 functions as a light path adjusting optical element for making the optical path of the light emanating from the first optical port 31 and the optical path of the light propagating to the third optical port 33 parallel to each other.

As shown in FIGS. 1A and 1B, according to this embodiment of the invention, the optical surfaces 8a and 8b of the first polarization divider/combiner 1, the optical surfaces 8c and 8d of the light path converter 4, and the optical surfaces 8e and 8f of the second polarization divider/combiner 7 form oblique optical surfaces. An optical signal entering the optical circulator 100 at optical port 31 and propagating along the first optical path to optical port 32 is shown to intersect the oblique optical surfaces 8a through 8f. Similarly, an optical signal entering the optical circulator 100 at optical port 32 and propagating along a second optical path to optical port 33 is shown to also intersect the oblique optical surfaces 8a through 8f. According to this embodiment, the first, second and third birefringent plates 1, 4 and 7 shown in FIGS. 1A and 1B are non-rectangular parallelepiped shaped optical elements disposed so that the optical surfaces 8a through 8f are non-perpendicular to the optical axis of the incident light emanating from the first or second optical port, thereby reflecting a portion of the incident light in a direction non-parallel to its incident direction.

According to this embodiment, the two oblique optical surfaces on each of the birefringent crystal plates 1, 4, and 7 are at least substantially parallel to each other, i.e., optical surface 8a is at least substantially parallel to optical surface 8b, optical surface 8c is at least substantially parallel to optical surface 8d, and optical surface 8e is at least substantially parallel to optical surface 8f. An optical element with optical surfaces that are slanted so as to be oblique with respect to the optical axis and are also at least substantially parallel to each other is referred to herein as having a parallel pair of oblique optical surfaces. Having at least substantially parallel optical surfaces can be advantageous as the optical elements can be less expensive to manufacture. In addition, at least substantially parallel optical surfaces can allow greater control of the optical signal path as the optical signal path exiting the optical element is at least substantially parallel to the optical path entering the optical element.

The non-optical surfaces on the optical elements having oblique optical surfaces, shown in FIGS. 1A and 1B as the first, second and third birefringent crystal plates 1, 4 and 7, are parallel to the optical axis of the optical circulator 100 in this embodiment. The second birefringent crystal plate 4 thus forms a parallelogram in the X-Z section as shown in FIG. 1A. The first birefringent crystal plate 1 and the third birefringent crystal plate 7 each form a parallelogram in the Y-Z section as shown in FIG. 1B. In advantageous embodiments, the optical surfaces of all optical elements constituting the optical circulator unit 30 have a profile irregularity of λ/2 or less (λ represents the wavelength of incident/exit light). In other words, the level difference throughout each optical surface is λ/2 or less.

The operation of the optical circulator 100 can be further described by discussing the propagation of light along the first and second optical paths, the first optical path connecting the first optical port 31 and the second optical port 32, and the second optical path connecting the second optical port 32 and the third optical port 33, referring to the structure of one embodiment of the invention as shown in FIGS. 1A and 1B. Describing the first optical path, light propagates along the first optical waveguide 11 which has been aligned on the central axis of the first lens 9, passes through the first optical port 31, passes through the central axis of the first lens 9 without being refracted and reaches prism 18. The light along the first optical path then propagates through the prism 18 without refracting and enters the optical circulator unit 30. Here, it is divided by the first polarization divider/combiner 1 into two polarization wave components with orthogonal planes of polarization that are emitted separately from the first polarization divider/combiner 1 as two light beams, an upper beam and a lower beam. Thereafter, the plane-polarization angle of the upper and lower light beams is rotated by the split half wave plate 2 to form plane-polarization states running parallel to each other before they are emitted from the split half wave plate 2. Then, the first Faraday rotator 3 rotates the polarization of the upper and lower light beams such that both light beams have a plane of polarization perpendicular to the optical axis direction of the light path converter 4 before they are emitted from the Faraday rotator 3. The light beams pass through the light path converter plate 4 and into the second Faraday rotator 5 which rotates the plane-polarization directions of the upper and lower light beams. The split half wave plate 6 further rotates the polarization of the light beams so that the plane of polarization of the upper light beam is now perpendicular to the plane of polarization of the lower light beam before they are emitted from the second split half wave plate 6. The upper and lower light beams are then combined by the second polarization divider/combiner 7 and emitted as a single light beam from the optical circulator unit 30. This single light beam propagates through the second lens 10, passes through the second optical port 32 and continues propagating into and through the second optical waveguide 12.

Now describing the second optical path, light propagating to the optical circulator through the second optical waveguide 12 passes through the second optical port 32, passes through the second lens 10 and enters the optical circulator unit 30. The light is then divided by the second polarization divider/combiner 7 into two polarized wave components with orthogonal planes of polarization that are emitted separately as an upper and a lower light beam from the polarization divider/combiner 7. Thereafter, the split half wave plate 6 rotates the planes of polarization of the upper and lower light beams to be parallel to each other before they are emitted from the split half wave plate 6. The second Faraday rotator 5 rotates the polarization of the upper and lower light beams so that their plane of polarization direction is parallel to the optical axis direction of the light path converter 4 before they are emitted from the Faraday rotator 5. The light beams then enter the light path converter 4 which shifts the upper and lower light beam in the X direction. The amount of the shift in the X direction is dependent on the index of refraction for the birefringent material used for the light path converter and the length of the light path through the birefringent material. The plane-polarization direction of the upper and lower light beams are then rotated by the first Faraday rotator 3 and further rotated by the split half wave plate 2 so that their plane-polarization directions are now perpendicular to each other. The light beams emitted from split half wave plate 2 are then combined by the first polarization divider/combiner 1 and the combined light is emitted from the optical circulator unit 30. The combined light beam then continues along the second optical path, entering the prism 18 at the tapered surface 18a. This light is refracted, as shown in FIG. 1A, and then passes through the first lens 9 where it is refracted further. The resulting refracted light then propagates along an optical path parallel to the central optical axis of the first lens 9, passes through the third port 33 and enters the third optical waveguide 13.

The optical circulator 100 shown in FIGS. 1A and 1B is one example of the many possible embodiments of this invention.

The first, second and third optical waveguides 11, 12 and 13 may be formed from optical fibers. Examples of usable optical fibers include single mode optical fibers, dispersion shifted optical fibers (optical fibers with the zero dispersion wavelength shifted to around 1.5 $\mu$m) and polarization maintaining optical fibers.

Various kinds of polarization maintaining optical fibers may be used for the first, second and third optical waveguides 11, 12 and 13. In one embodiment, the optical waveguides are so-called panda type optical fibers. As shown in FIG. 2, in a panda type optical fiber the optic core 22 is flanked with stress imparting portions 23 in the X-Y section perpendicular to the optical axis direction of this polarization maintaining optical fiber. The panda type optical fiber has a first polarization maintaining axis in a direction S along which the stress imparting portions 23 are arranged and has a second polarization maintaining axis in a direction T that is perpendicular to the first polarization maintaining axis.

As shown in FIG. 3, the first polarization maintaining axis of the first optical waveguide 11 and the first polarization maintaining axis direction of the third optical waveguide 13 are oriented so as to be either substantially perpendicular or substantially parallel to each other. The polarization maintaining direction of the first and third optical waveguides 11 and 13 may be made to coincide with one of the polarization directions of the polarized wave components divided or combined by the first polarization divider/combiner 1 that is disposed in the optical circulator unit 30. This arrangement can reduce the polarization dependent loss to almost zero.

The first, second and third optical waveguides 11, 12 and 13 are formed from panda type optical fibers in the above embodiments. Polarization maintaining optical fibers other than panda type optical fibers may also be used to form the optical waveguides, according to other embodiments. For example, single mode optical fibers whose zero-dispersion wavelength is 1.3 $\mu$m, dispersion shifted optical fibers having a zero-dispersion wavelength of 1.55 $\mu$m, and other similar optical fibers may also be used.

The first optical waveguide and the third optical waveguide may be held in a capillary 21, shown in FIG. 4A. The capillary 21 is shown to have optical waveguide insertion holes 20a and 20b that can appropriately hold the inserted optical waveguides with high reliability. The pitch, the center-to-center distance between the optical waveguide insertion holes 20a and 20b, is within a range of 0.125 mm to 0.15 mm in some embodiments. The pitch for the optical waveguide insertion holes 20a and 20b is not limited to this particular distance and can be set with discretion to another suitable distance. For example, the pitch may be set within a range of 0.125 mm to 0.3 mm according to another embodiment.

The optical end faces of the capillary 21 and the connection end faces of the first optical waveguide 11 and the third optical waveguide 13 may be slanted obliquely with respect to the optical axis. While the end faces of the first and second optical waveguides 11 and 13 and the capillary 21 connection end faces are not necessarily slanted with respect to the optical axis according to all embodiments of the invention, the return loss can be controlled more effectively when the optical waveguide end faces and the connection end faces are both slanted.

The capillary 21 can be made from an epoxy resin and can have a filler content ratio of equal to or more than 60% by weight and a mold shrinkage ratio of 10% or less. According to other embodiments, the capillary 21 can be formed from engineering plastics other than epoxy resin. For example, thermoplastic polyphenylene sulfide, zirconia, glass, etc. may also be used to form the capillary. The filler content ratio of the material forming the capillary 21 is not particularly limited but can be set to various other suitable ratios.

As shown in FIG. 4A, the optical waveguide insertion hole 20a of the capillary 21 is placed on the central axis of the capillary. The two optical waveguide insertion holes 20*a* and 20*b* are parallel to each other. The capillary 21 is arranged such that the optical waveguide insertion holes 20*a* and 20*b* are parallel to the optical axis of the optical circulator.

The capillary 21 has two optical waveguide insertion holes 20*a* and 20*b*. The capillary may take other configurations such as the one shown in FIG. 4B, according to another embodiment. In FIG. 4B, the optical waveguide insertion hole 20*a* is disposed in the center of the capillary and a optical waveguide insertion hole 20*b* and another optical waveguide insertion hole 20*c* are disposed on opposite sides of the optical waveguide insertion hole 20*a*.

Figure 5A:
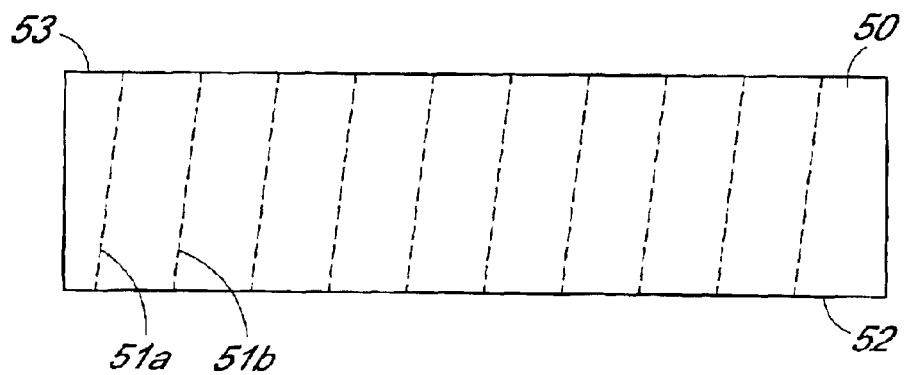
FIG. 5A is a plan view showing an example of how to manufacture an optical element with oblique optical surfaces according to an embodiment of the invention.
Figure 5B:
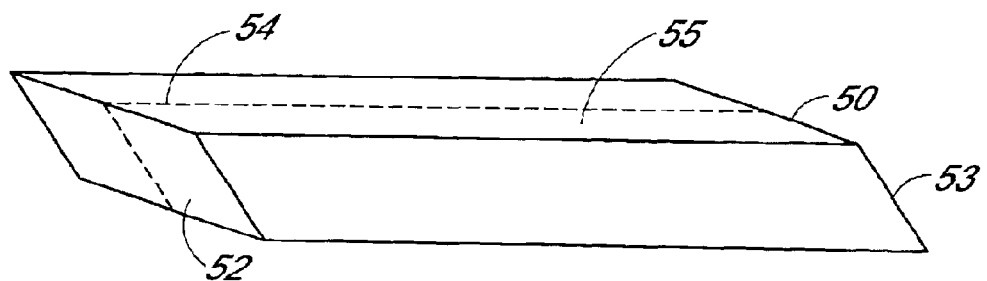
FIG. 5B is a perspective view showing an example of how to manufacture an optical element with oblique optical surfaces according to an embodiment of the invention.

Methods of forming a birefringent crystal plate with a parallel pair of oblique optical surfaces are shown in FIGS. 5A and 5B and described below. A birefringent crystal plate formed by these two methods can be arranged with other optical elements to form an optical circulator unit, establishing optical paths connecting entry and exit ports.

An optical element, such as the birefringent crystal plates 1, 4, and 7 can be manufactured by cutting an optical wafer to form oblique optical surfaces. As shown in FIG. 5A, according to one embodiment of the invention, an optical wafer 50 is cut along a first plane 51*a* that intersects the lateral sides 52 and 53 of the optical wafer 50, the lateral sides being parallel to the optical wafer's longitudinal axis, and where the first plane 51*a* is obliquely slanted with respect to the longitudinal axis. The optical wafer 50 is then cut along a second plane 51*b* that also intersects the lateral sides 52 and 53 of the optical wafer 50. The cut surfaces of the resulting optical element are then polished so as to form optical surfaces.

As shown in FIG. 5B, according to another embodiment of the invention, a first oblique optical surface is made by polishing a first surface 52 of a lateral side of an optical wafer 50, the first surface 52 being slanted to form an oblique angle with the top surface of the optical wafer 50, and then polishing a second surface 53 forming a lateral side of the optical wafer 50 to form a second oblique optical surface. Cutting the optical wafer 50 along a plane 54 intersecting the first surface 52 and the second surface 53 and perpendicular to the top surface 55 of the optical prism forms the optical element with oblique optical surfaces.

The plan view of an optical circulator 106 in FIG. 6 shows a structural configuration according to another embodiment of the present invention. While the optical components contained in the optical circulator 106 are similar to those of the optical circulator 101 shown in FIG. 1, the structural configuration of the optical circulator 116 in FIG. 6 exhibits a unique characteristic in that all of the optical elements constituting the optical circulator unit 30 have their optical surfaces slanted with respect to the optical axis to form oblique optical surfaces. Specifically, the optical surfaces 8*a* through 8*f* of the first polarization divider/combiner 1, the light path converter 4 and the second polarization divider/combiner 7, and the optical surfaces 8*g* through 8*n* of the first split half wave plate 2, the second split half wave plate 6, the first Faraday rotator 3 and the second Faraday rotator 5 are all oblique optical surfaces.

The optical circulator 106 in FIG. 6 operates in a similar way and has a similar functional effect as the optical circulator 101 in FIG. 1, i.e., it transfers light along a first optical path connecting the first optical port 31 and the second optical port 32, and along a second optical path connecting the second optical port 32 and the third optical port 33. However, as all the optical elements in the optical circulator 106 are slanted to form oblique optical surfaces, the optical circulator 106 allows greater control of the return loss that is caused by an optical element reflecting light incident on its optical surface back in the direction the light came from.

FIG. 7 shows a plan view of an optical circulator 107 according to another embodiment of the present invention. Components of optical circulator 107 which have the same name as the components in optical circulator 101 are denoted by the same reference symbol and the explanations thereof will not be repeated. The structure of optical circulator 107 differs from those optical circulators previously described in that it includes an optical offset 19 configured to produce a parallel X direction shift in the optical path of light incident on its optical surfaces. As shown in FIG. 7, the optical offset 19 is disposed between the optical circulator unit 30 and the second lens 10, according to this embodiment of the invention.

The use of an the optical offset 19 can be beneficial to the optical circulator design. Shifting the light beam in a parallel direction when it passes through the optical offset 19 can reduce the lateral distance between the optical axis of light emanating from both the first optical port 31 and the optical axis of light incident on the second optical port 32, and it can reduce the lateral distance between the optical axis of light emanating from the second optical port 32 and the optical axis of light incident on the third optical port 33. The optical offset 19 allows the degree of offset to be set with discretion to an appropriate distance to advantageously reduce the deviation between the central axis of the first lens 9 and the central axis of the second lens 10, facilitating at least substantially aligning the central axis of the first lens 9 to the central axis of the second lens 10. The optical circulator can thus be made smaller.

In a different embodiment of the invention, the optical offset 19 may contain certain characteristics to increase its optical effectiveness. The optical surfaces 8*p* and 8*q* may be coated with an anti-reflection coating to maximize the amount of incident optical signal entering and passing through the optical offset 19, so that return loss is controlled even more effectively. According to another embodiment, wavelength-selective filters may be formed on the optical surfaces 8*p* and 8*q* instead of an anti-reflective coating. Wavelength-selective filters formed on the optical surfaces 8*p* and 8*q* of the optical offset 19 can block undesirable light (e.g., excitation light) while allowing signal light to pass through the filters.

The optical surfaces 8*p* and 8*q* of the optical offset 19 shown in FIG. 7 are slanted with respect to the optical axis to form oblique optical surfaces, preventing the optical offset 19 from increasing the amount of light reflected back along the incident light path. The non-optical surfaces of the optical offset 19 are shown to be parallel to the optical axis, according to this embodiment of the invention, making it easier to position and secure the optical offset 19 in the optical circulator. According to other embodiments of the invention, the optical surfaces 8*p* and 8*q* of the optical offset 19 may not always be slanted with respect to the optical axis and the non-optical surfaces 8*p* and 8*q* may not always be parallel to the optical axis. Return loss can be controlled when the optical surfaces 8*p* and 8*q* of the optical offset 19 are perpendicular to the optical axis if the optical surfaces 8*p* and 8*q* are coated with an anti-reflection coating.

Figure 8A:
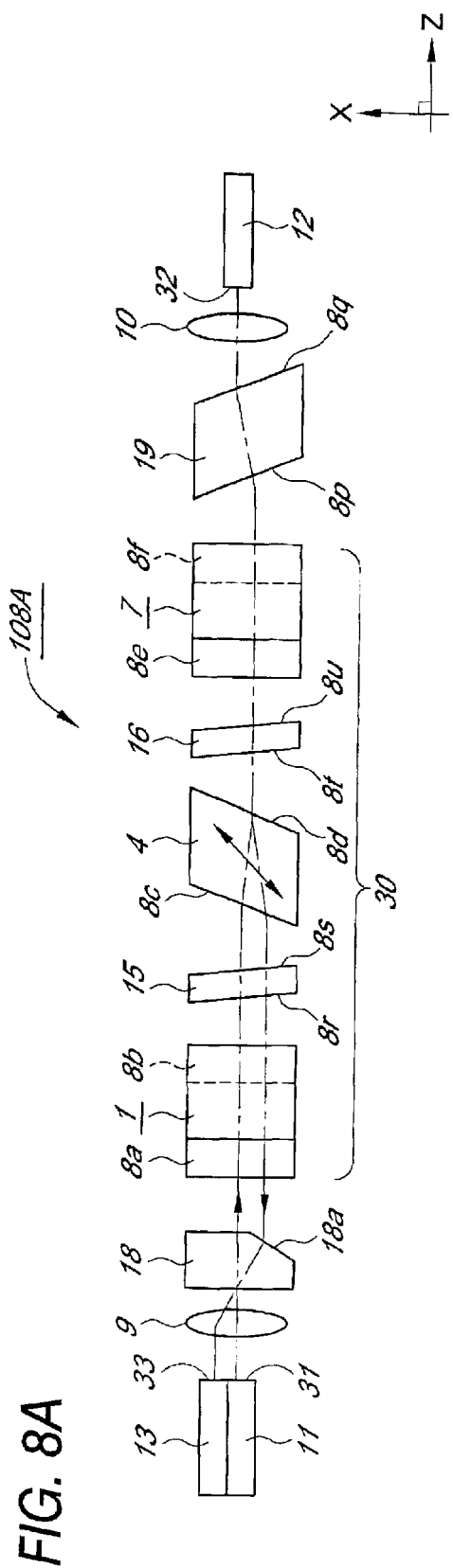
FIG. 8A is a plan view showing a structural diagram of an optical circulator containing split Faraday rotators, according to one embodiment of the invention.

The configuration of an optical circulator is not limited to placing the optical offset 19 between the optical circulator unit 30 and the second lens 10 as shown in FIGS. 7 and 8A.

According to another embodiment of the invention, the optical offset 19 may be placed between the optical circulator unit 30 and the prism 18. In yet another embodiment of the invention, the optical offset may be placed inside the optical circulator unit 30.

Figure 10:
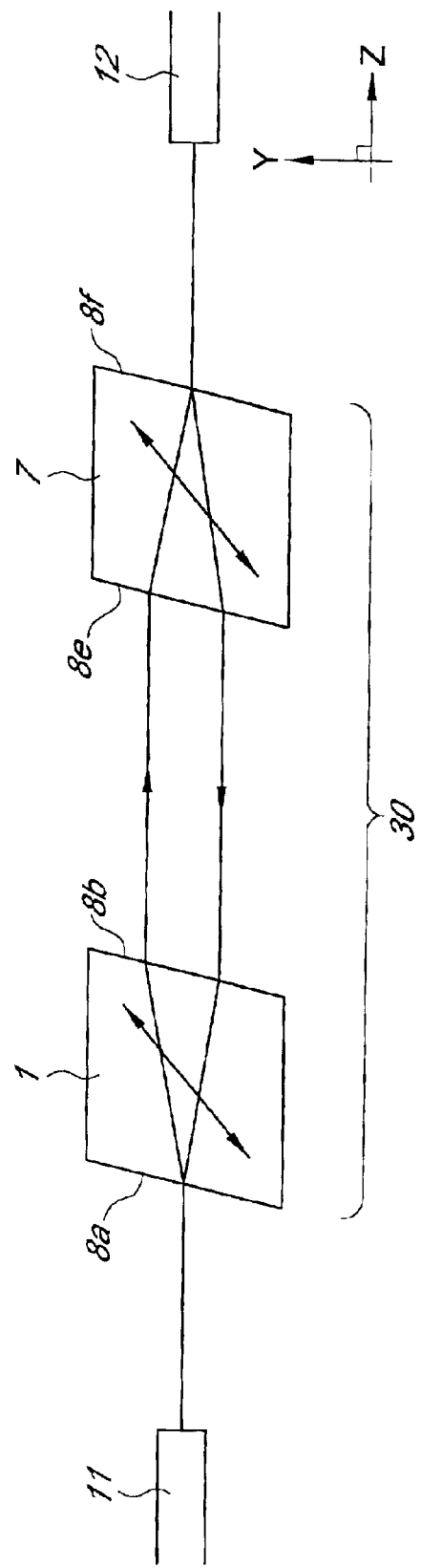
FIG. 10 is a conceptual diagram of an optical circulator showing an optical circulator unit, according to one embodiment of the invention.
Figure 13:
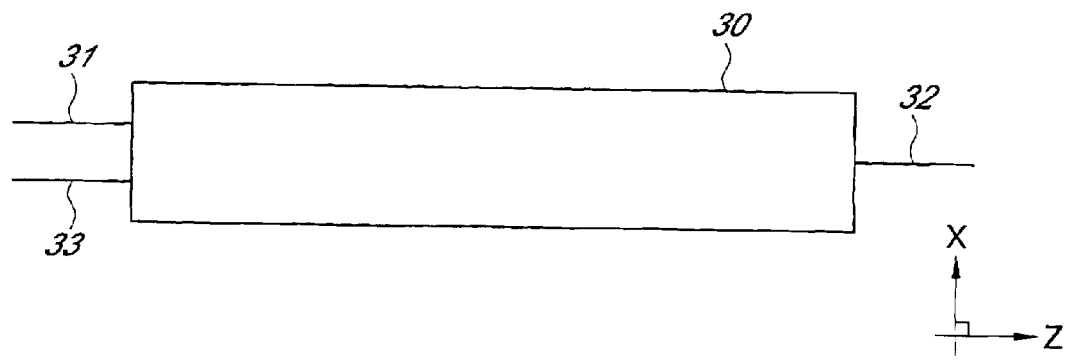
FIG. 13 is a diagram showing a comparative example of an optical circulator.

The optical offset 19 can be formed from a parallel plate prism, as shown in FIGS. 7 and 8A, but it is not limited to that embodiment. In an alternative embodiment of the invention, birefringent crystal plates (e.g., the first birefringent crystal plate 1 and the third birefringent crystal plate 7 in this embodiment) can function as the optical offset if the slope of the optical surfaces is angled appropriately to manifest the offset characteristic, as shown in FIG. 10. The first birefringent crystal plate 1 and the third birefringent crystal plate 7 are shown in FIG. 10 without the interposed optical elements. In this embodiment, first birefringent crystal plate 1 and the third birefringent crystal plate 7 shift the optical axis to reduce the degree of Y direction offset between the optical axis of light emanating from the first optical waveguide 11 and the optical axis of light entering the second optical waveguide 12.

Referring now to FIG. 8A, a plan view of an optical circulator 108a is shown according to another embodiment of the present invention. Components of FIG. 8A which have the same name as those in FIGS. 1, 6 and 7 are denoted by the same reference symbols and explanations thereof will not be repeated.

The functionality of the optical circulator 108a shown in FIG. 8A is generally the same as the optical circulator 107 shown in FIG. 7, however, the number of optical components contained in the optical circulator unit 30 has been reduced. According to this embodiment of the invention, a first split Faraday rotator 15 is disposed in the structure of the optical circulator unit 30 shown in FIG. 8A, in place of the split half wave plate 2 and the Faraday rotator 3 shown in FIG. 7, and operates as the first polarization rotator. Also, a second split Faraday rotator 16 is disposed in the structure of the optical circulator unit 30 shown in FIG. 8A, in place of the split half wave plate 6 and the Faraday rotator 5 shown in FIG. 7, and operates as the second polarization rotator. An advantage of using split Faraday rotators is that the number of optical components contained in the optical circulator unit 30 shown in FIG. 7 can be reduced. Therefore, the structure of the optical circulator unit 30 can be correspondingly simplified.

As the split Faraday rotators 15 and 16 are non-reciprocal polarization rotators, using split Faraday rotators changes the first and second polarization rotators in FIG. 8A to be solely non-reciprocal polarization rotators. The split Faraday rotator 15 is composed of two Faraday rotators, namely, two non-reciprocal polarization rotator sub-elements 15a and 15b that have different polarization rotating angles (e.g., +45° and −45°). Similarly, the split Faraday rotator 16 is composed of two Faraday rotators, namely, two non-reciprocal polarization sub-elements 16a and 16b that have different polarization rotating angles (e.g., +45° and 45°). The split Faraday rotator 15 and 16 are arranged in a direction intersecting the optical axis of the optical circulator unit 30 so that an upper light beam from the first and second optical paths can pass through the top non-reciprocal polarization rotator elements 15a and 16a and a lower light beam from the first and second optical paths can pass through the lower non-reciprocal polarization rotator elements 15b and 16b. Magnetic fields differing in direction from each other are applied to form the polarization rotating angles of the Faraday rotator elements 15a, 15b, 16a and 16b constituting the split Faraday rotator 15 and the split Faraday rotator 16, respectively. The rotation angle imparted on the plane of polarization can be varied and adjusted by changing the magnetic field applied to the Faraday rotators elements 15a, 15b, 16a and 16b.

Figure 8B:
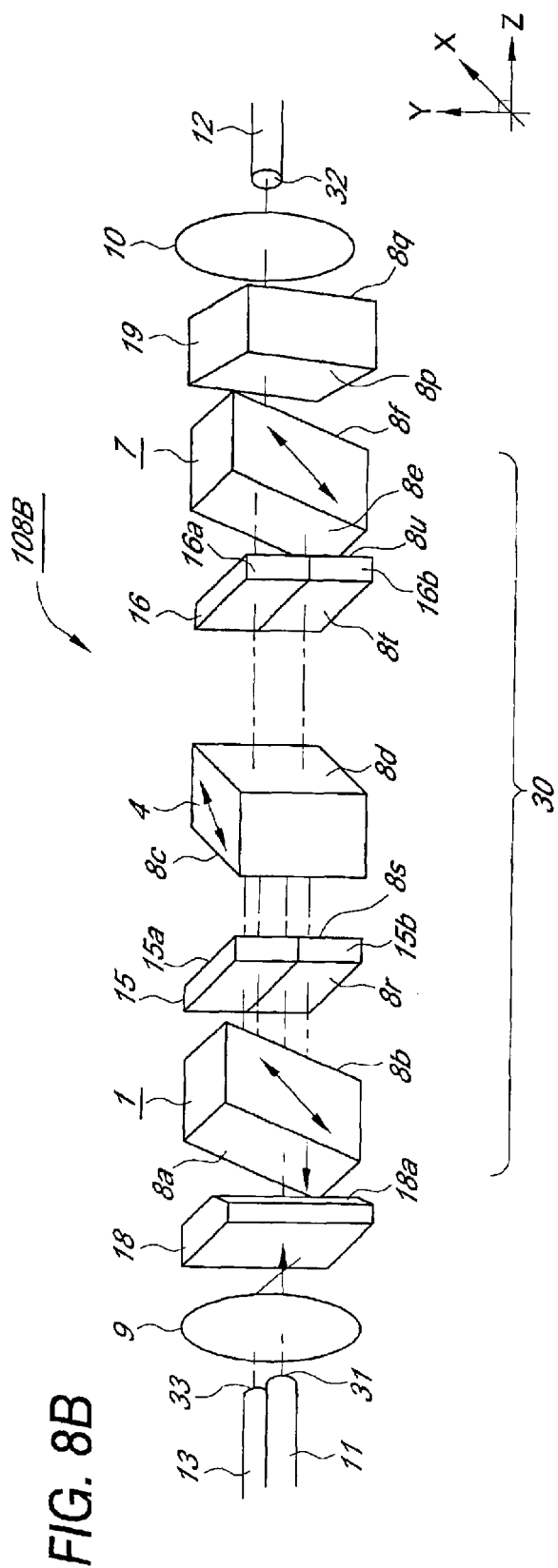
FIG. 8B is a perspective view showing a structural diagram of an optical circulator containing split Faraday rotators, according to one embodiment of the invention

According to another embodiment of the invention, the split Faraday rotators 15 and 16 are positioned so as to be oblique with respect to the optical axis, as shown in FIG. 8B. Therefore, the optical surfaces 8r and 8s of the split Faraday rotator 15 and optical surfaces 8t and 8u of the split Faraday rotator 16 are slanted with respect to the optical axis to form oblique optical surfaces. As discussed previously, an optical circulator configured with numerous oblique optical surfaces is advantageous as the increased number of oblique optical surfaces will help control the return loss of the optical circulator by reflecting light not passing through the optical surface in a direction other than back along the direction it came from.

The present invention is not limited to the embodiments previously described but may manifest itself in various other configurations. One example of another configuration that embodies the invention is the optical circulator 109a shown in FIG. 9A. The structure of the optical circulator unit 30 contained in the optical circulator 109a contains rectangular parallelepiped shaped optical elements, specifically a first polarization divider/combiner 1, a light path converter 4 and a second polarization divider/combiner 7, positioned so that their optical surfaces are slanted with respect to the optical axis, thereby making the optical surfaces 8a through 8f oblique optical surfaces slanted with respect to the optical axis. As shown in FIG. 9A, the optical elements in the optical circulator unit 30 are similarly slanted with respect to the optical axis so that the optical surfaces of one optical element are at least substantially parallel the optical surfaces of another optical element.

An example of an alternative configuration, according to another embodiment of the invention, is the optical circulator 109b as shown in FIG. 9B. The structure of the optical circulator unit 30 contained in the optical circulator 109b contains the same rectangular optical elements as the optical circulator 109a shown in FIG. 9A and the optical surfaces 8b through 8n are also slanted with respect to the optical axis to form oblique optical surfaces. However, according to this embodiment, the optical surfaces of a given one of the optical elements contained in the optical circulator unit 30 are not necessarily substantially parallel to the optical surfaces of the other optical elements contained therein.

FIG. 11 is a plan view of an optical circulator 111 according to another embodiment of the invention. Unlike the previously described embodiments, the optical surfaces of the optical elements constituting the optical circulator unit 30 in FIG. 11 are perpendicular to the optical axis. An offset shift of the light propagating through the optical circulator unit 30 is imparted by the first, second and third birefringent crystals 1, 4, and 7. In optical circulator 111, the first optical waveguide 11 and the third optical waveguide 13 are arranged adjacent to each other, the first optical waveguide 11 is placed on the central axis of the first lens 9 and the second optical waveguide is placed on the central axis of the second lens. This structure facilitates substantially aligning the central axis of the first lens 9 and the central axis of the second lens 12. In FIG. 11 and FIG. 12 the optical waveguide 11 is chosen to be placed on the central axis of the first lens 9. However, according to another embodiment, the third optical waveguide 13 is placed on the central axis of the first lens 9 and the first optical waveguide 11 is positioned adjacently.

The optical circulator 112 in FIG. 12 is shown in a perspective view and is similar to the optical circulator 111 in FIG. 11 except that it contains an additional optical offset element 19. This structure can also facilitate substantially aligning the central axis of the first lens 9 and the central axis of the second lens 12. In this embodiment of the invention, the optical offset 19 is formed from a parallel flat prism and disposed between the optical circulator unit 30 and the second lens 10.

The optical circulators previously described can be included in many simple or complex optical systems including optical communication systems. These optical communications systems can include elements that are well known to one of ordinary skill in the art including one or more optical signal emitters, one or more optical signal receivers and optical fiber. According to embodiments of the described invention, the optical communication systems also include at least one optical circulator as previously described herein and shown in FIGS. 1A, 6, 7, 8A, 9A, 9B, 11 or 12 to advantageously control return loss and/or increase system reliability.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated The scope of the invention should therefore be construed in accordance with the appended claims and any equivalents therefore.

What is claimed is:

1. An optical circulator comprising:
   at least three optical signal ports;
   at least one optical element having optical surfaces slanted with respect to an optical axis so as to form at least a pair of oblique optical surfaces, the relative slant of said optical surfaces such that an optical path direction exiting said optical element is at least substantially parallel to said optical path direction entering said optical element;
   an optical offset element configured to produce a parallel shift in the optical path of light propagating through said optical offset element; and
   wherein said optical offset element has optical surfaces slanted with respect to the optical axis of said optical circulator so as to form oblique optical surfaces.

2. The optical circulator of claim 1, wherein said optical element of said optical circulator has surfaces other than said oblique optical surfaces which are at least substantially parallel to the optical axis of said optical circulator unit.

3. The optical circulator of claim 1, wherein said optical element intersects a first optical path connecting a first optical port and a second optical port, and intersects a second optical path connecting said second optical port and a third optical port.

4. The optical circulator of claim 1, further comprising one or more birefringent crystals.

5. The optical circulator of claim 1, wherein said optical offset element comprises a parallel flat prism.

6. The optical circulator of claim 1, wherein the optical surfaces of said optical offset element are coated with an anti-reflection material or have wavelength selective filters formed thereon.

7. An optical circulator having at least three optical ports and configured to route light input at port n to port n+1 comprising:

at least one optical element of a non-rectangular parallelepiped shape
   an optical offset element configured to produce a parallel shift in the optical path of light propagating through said optical offset element; and
   said optical offset element has optical surfaces slanted with respect to the optical axis of said optical circulator so as to form oblique optical surfaces.

8. The optical circulator of claim 7, further comprising:
   first, second and third optical ports;
   a first birefringent polarization divider/combiner optical element;
   a first polarization rotator;
   a birefringent light path converter;
   a second polarization rotator;
   a second birefringent polarization divider/combiner optical element.

9. The optical circulator of claim 7, wherein the first and second polarization rotators each comprise a reciprocal polarization rotational optical element and a non-reciprocal polarization rotational optical element.

10. The optical circulator of claim 9, herein the reciprocal polarization rotational optical element comprises a split half wave plate.

11. The optical circulator of claim 9, wherein the non-reciprocal polarization rotational optical element comprises a Faraday rotator.

12. The optical circulator of claim 8, wherein the first and second polarization rotators comprise non-reciprocal polarization rotational optical elements.

13. The optical circulator of claim 12, wherein each said non-reciprocal polarization rotational optical element comprises two non-reciprocal polarization rotating sub-elements that have different polarization rotating angles.

14. The optical circulator of claim 12, wherein said non-reciprocal polarization optical elements are Faraday rotators having different polarization rotating angles obtained by applying magnetic fields differing from each other in direction.

15. The optical circulator of claim 14, wherein the Faraday rotation angle can be varied by changing the magnetic field applied to the Faraday rotator.

16. An optical circulator comprising:
   at least three optical signal ports;
   an at least substantially parallelepiped shaped optical element disposed so that its optical surfaces are non-perpendicular to an optical axis, whereby at least some incident light is reflected in a direction non-parallel to its incident direction;
   an optical offset element configured to produce a parallel shift in the optical path of light propagating through said optical offset element; and
   wherein said optical offset element has optical surfaces slanted with respect to the optical axis of said optical circulator so as to form oblique optical surfaces.

17. The optical circulator of claim 16, wherein the non-optical surfaces of said optical element are parallel to the optical axis.

18. An optical communication system comprising:
   optical fiber;
   at least one optical signal emitter;
   at least one optical signal receiver;
   an optical circulator comprising at least one optical element having optical surfaces slanted with respect to an optical axis so as to form at least a pair of oblique optical surfaces, the relative slant of said optical surfaces such that the optical path direction exiting said optical element is at least substantially parallel to said optical path direction entering said optical element and an optical offset element configured to produce a parallel shift in the optical path of light propagating through said optical offset element, said optical offset element having optical surfaces slanted with respect to the optical axis of said optical circulator so as to form oblique optical surfaces.

* * * * *

UNITED STATES PATENT AND TRADEMARK OFFICE
CERTIFICATE OF CORRECTION

PATENT NO.    : 6,826,323 B2
DATED         : November 30, 2004
INVENTOR(S)   : Konishi et al.

It is certified that error appears in the above-identified patent and that said Letters Patent is hereby corrected as shown below:

<u>Column 18,</u>
Line 2, after "shape" please insert -- ; --.
Line 24, please delete "herein" and insert therefore, -- wherein --.
Line 47, please delete "an" and insert therefore, -- and --.

Signed and Sealed this

Twenty-ninth Day of November, 2005

JON W. DUDAS
*Director of the United States Patent and Trademark Office*